United States Patent [19]

Baumgartner et al.

[11] 4,038,092

[45] July 26, 1977

[54] STRENGTHENING REACTION SINTERED SILICON NITRIDE

[75] Inventors: Hans R. Baumgartner, Worcester, Mass.; Stephen D. Skrovanek, Allentown, Pa.

[73] Assignee: Norton Company, Worcester, Mass.

[21] Appl. No.: 653,648

[22] Filed: Jan. 30, 1976

[51] Int. Cl.$^2$ .................. C04B 35/58; C04B 35/70; F27B 9/04

[52] U.S. Cl. .................... 106/73.4; 106/55; 106/73.5; 264/82; 264/60; 264/65; 264/66

[58] Field of Search ............... 106/73.4, 55, 73.5; 264/82, 60, 65, 66; 428/212, 218; 427/226

[56] References Cited

U.S. PATENT DOCUMENTS

| | | | |
|---|---|---|---|
| 3,222,438 | 12/1965 | Parr et al. | 264/66 |
| 3,409,417 | 11/1968 | Yates | 264/60 X |
| 3,427,373 | 2/1969 | Matsuo et al. | 264/65 X |
| 3,535,154 | 10/1970 | Meyer-Simon et al. | 427/226 |
| 3,639,101 | 2/1972 | Washburn | 106/44 |
| 3,824,120 | 7/1974 | Davildge et al. | 264/65 |
| 3,903,230 | 9/1975 | Kamigaito et al. | 264/65 X |

FOREIGN PATENT DOCUMENTS 2,221,421  11/1974  France

*Primary Examiner*—J. Poer
*Assistant Examiner*—William G. Wright
*Attorney, Agent, or Firm*—Oliver W. Hayes

[57] ABSTRACT

The strength of a reaction sintered silicon nitride body is substantially increased by impregnating the surface of the body with finely divided alumina and then firing the body in a nitrogen atmosphere to a temperature in excess of 1200° C, the reaction being carried out under an appreciable partial pressure of SiO.

5 Claims, No Drawings

STRENGTHENING REACTION SINTERED SILICON NITRIDE

BACKGROUND OF THE INVENTION

Reaction sintered silicon nitride has shown considerable promise as a structural ceramic for high temperature applications due to the ease of formation of the product into complex shapes prior to the final reaction sintering step. However, for some applications the final strength of the product is not as high as desired. The current state of the art has been summarized in the recent survey article of Messier and Wong "Ceramics for High Performance Applications," Burke, Gorum, and Katz 2nd Army Material Technology Conference Series (copyright 1974 by Brook Hill Publishing Company). While considerable advances have recently been made, particularly following the teachings of Washburn as described in co-pending application Ser. No. 370,745 filed June 18, 1973, it is desired to obtain even higher strengths than those obtained by Washburn. Certain prior work done by Godfrey and Pitman (see particularly pages 436 and 437 of the same "Ceramics for High Performance Applications" mentioned above) attempted to improve the strength of a reaction sintered silicon nitride body by providing an alumina coating on the body with subsequent heat treatment. However the results, on firing, were found to decrease, rather than increase, the strength of the fired body.

Kirchner in "Chemical Strengthening of Ceramic Materials," (6 December 1971 National Technical Information Service AD735135), makes reference to the treatment of a low strength, reaction sintered silicon nitride body, with boiling tetraethylorthosilicate (see pages 74–75). The silicate was hydrolyzed by use of HCl and the body was then fired to 975° C in an unspecified atmosphere. The strength of the body increased from 18,300 p.s.i. to 22,300 p.s.i. No data are given on the use of higher strength starting materials.

While Professor Jack (pages 284 and 285 of the above "Ceramics for High Performance Applications") has made some products of undisclosed "high" strength by reacting mixtures of silicon nitride and alumina to form "beta sialon," no data is given as to what strengths were obtained, with and without the alumina. Also the bodies were not formed by reaction sintering silicon powder; the silicon nitride powder had been prepared separately and was then mixed with the alumina and formed into a shaped body. Jack mentions that, during the firing, there must be a sufficient partial pressure of oxygen in the flowing nitrogen atmosphere to form $SiO_2$ and thereby prevent volatilization of silicon nitride according to the reaction $Si_3N_4 + 1\frac{1}{2} O_2 \rightarrow 3 SiO + 2N_2$. Similarly, the French patent to Mary, Lortholary, Goursat and Billy U.S. Pat. No. 2,221,421 dated Oct. 11, 1974 describes a process for fabricating a body from silicon oxynitride powder which is mixed with alumina, formed into a shaped body, then coated with silicon oxynitride (or a mixture comprising the constituents of silicon oxynitride) and then heated between 1250° and 1850° C in air, inert gas, or nitrogen. The principal objective of the French patent was to increase the density of the fired product; no data are given on strengths.

SUMMARY OF THE INVENTION

In the present invention a reaction sintered silicon nitride body, which has been shaped prior to reaction sintering, is strengthened by impregnating the surface with finely divided alumina and then firing in a nitrogen atmosphere at a temperature of the order of 1200° to 1400° C to form what is believed to be a thin "beta sialon" surface layer on the formed body. The firing is carried out in the presence of an appreciable partial pressure of SiO to prevent dissociation of silicon nitride and a loss of silicon from the body by SiO vaporization. While the exact mechanisms involved are not completely understood, and while the final chemical compounds existing in the surface layer are not positively identified, there is a substantial increase in the strength of the body after this treatment.

DETAILED DESCRIPTION OF THE INVENTION

Fine silicon powder is formed into a compact as described in the above mentioned co-pending application of Washburn (for example see corresponding Italian Pat. No. 986,738 granted Jan. 30, 1975) and is shaped and fired in a nitrogen atmosphere to convert the silicon to silicon nitride. A number of sample test bars were then treated as described in the following non-limiting example.

EXAMPLE I

Reaction-sintered $Si_3N_4$ specimens, $\frac{1}{8} \times \frac{1}{8} \times 1\frac{1}{2}$ inch, ($g = 2.54$ gms/cm$^3$) were coated with aluminum sulfate suspended in a toluene vehicle by applying the solution with a small brush. To decompose the aluminum sulfate to alumina, the specimens were fired in air at 1000° C for 2 hours. Excess alumina was wiped off and weight changes measured. Initially, one, two, and three coatings were attempted. Two coatings were found optimal on the basis of weight gain after decomposition.

Subsequent thermal treatments were performed in a 2 inch diameter mullite tube furnace. Specimens were placed on $Si_3N_4$ setters located on an alumina plate. Small alumina boats containing a 1:1 molar ratio of Si to $SiO_2$ were placed on the two ends of the specimens. Prior to thermal treatments, the tube was purged with dry $N_2$ and then filled with $N_2$ and sealed. The heat treatment atmosphere might then be described as "stagnant" nitrogen, with some partial pressure of SiO.

The following heat treating schedules were performed:

a. Heated to 1200° C and held 12 hours, heated to 1500° C and held for 2 hours. Furnace-cooled to 1200° C and held for $\frac{1}{2}$ hour, furnace-cooled to 800° C and held for $\frac{1}{2}$ hour, furnace-cooled to room temperature.

b. Same as (a), except held at 1500° C for 5 hours, c. Heated to 1200° C and held for 12 hours, heated to 1390° C and held for 2 hours. Same cooling schedule as in (a).

d. Same as (c), except furnace-cooled directly to room temperature.

e. Same as (c), but no 1200° C hold.

f. Heated to 1390° C and held for 20 hours, heated to 1500° C and held for 2 hours. Same cooling schedule as in (a).

Fracture strengths were measured in three point bending and are set forth below in Table I.

Table I

| Treatment | Room Temperaure Fracture Strengths | |
|---|---|---|
| | MOR(± 2σ) | Strength Increase |
| as-rec'd. | 35,279 ± 2,751 psi | |
| A | 39,563 ± 2,187 | 12.1% |
| B | 40,109 ± 3,243 | 13.7 |

Table I-continued

| Treatment | Room Temperaure Fracture Strengths MOR(± 2σ) | Strength Increase |
|---|---|---|
| C | 53,279 ± 6,606 | 51.0 |
| D | 46,868 ± 6,126 | 32.8 |
| E | 41,303 ± 6,862 | 17.1 |
| F | 49,682 ± 4,746 | 40.8 |

EXAMPLE II

In previous experiments, samples of $Si_3N_4$ test bars whose surfaces had been impregnated with alumina in the same manner as described in Example I were fired in atmospheres of nitrogen, argon, and helium with no partial pressure of SiO. This lack of SiO partial pressure resulted in sample surfaces that appeared discolored and pock-marked. Accompanying this were significant weight losses and corresponding decreases in strength. Strength degraded to a value approximately one-half that of the as-received samples.

It is believed that this weight loss was due to the reduction of surface silicon compounds ($SiO_2$, $Si_2ON_2$ etc.) on the specimens, resulting in the formation of volatile silicon monoxide, SiO.

In the present invention, as described in Example I, the reduction of silicon compounds is prevented through the formation of a sufficient partial pressure of SiO from an external source, i.e. the alumina boats containing the ($Si/SiO_2$) mixtures. Theoretical data show that significant SiO is formed at temperatures of about 1200° C and greater. The calculated values of the partial pressure of SiO over a mixtue of Si and $SiO_2$ at various temperatures are given in the following Table II.

TABLE II

| Temperature | P(SiO) (mm Hg) |
|---|---|
| 1100° C | .2 |
| 1200° C | .6 |
| 1250° C | 1.2 |
| 1300° C | 2.1 |
| 1350° C | 3.6 |
| 1400° C | 6.0 |

When the boats (containing Si and $SiO_2$) were installed as in Example I very slight weight gains were noted rather than the weight losses previously observed in Example II. Apparently, the reduction of the specimen's $SiO_2$ (or $Si_2ON_2$) is suppressed. The weight gains may be due to the formation of additional silicon compounds by reaction of silicon released as the "beta sialon" is formed by reaction of $Al_2O_3$, $Si_3N_4$ and nitrogen in the furnace atmosphere.

From the strength data summarized in Table I for various heat treatments it appears that increases in strength ranged from about 10%-15% relative to the as-received samples. From a consideration of the heat treatment schedules, maximum strength would appear to depend on the following parameters:

1. A long-time hold at 1200° C or above to produce sufficient SiO.
2. A maximum firing temperature during at least the early part of the cycle of about 1400° C.

The reasons for these temperature effects are not presently understood. It may have something to do with the melting point of whatever elemental silicon is present at the surface, whether remaining from the unreacted silicon in the starting material or produced as the result of displacement of Si from $Si_3N_4$ during the reaction between $Si_3N_4$ and $Al_2O_3$. In either case it is difficult to see how there can be very much unreacted silicon in the product during the firing. It also may be necessary to remain below about 1400° C during most of the run to prevent recrystallization of the very finely divided $Al_2O_3$ in the pores of the surface layer. Such recrystallization might drastically affect the rate at which $Si_3N_4$ and $Al_2O_3$ react.

Profiles of Al and Si have been obtained with the electron microprobe. It should be noted that the microprobe does not differentiate between combined and free Si or Al. Currently, only the 1500° C firings have been studied. At the surface, it was found that the concentration of silicon is about 10 times as great as that of aluminum. This was subsequently verified by energy-dispersive x-ray photographs of sample surfaces. The silicon concentration appears to be relatively constant throughout the sample, but the aluminum concentration falls off exponentially. The last trace of Al was observed at a depth of about 200 microns in the two-hour samples and about 225 microns in the five-hour samples. In addition, the five-hour samples showed a slightly "flatter" profile.

At the present time, scanning electron micrographs have not revealed any startling facts about the fracture process or surface coating. A rather interesting visual observation has been noted. It appears that a definite shift in the fracture origin occurs, from surface near corner origins on the as-received samples, to an origin deeper in the sample and shifted toward the center for the treated samples.

While the exact mechanism involved in the strengthening effect achieved by the present invention is not completely understood the above data certainly indicate the existence of the effect and its importance to achieving a high strength product. However, there are a few things which can be clearly demonstrated. The strength increase results from a decrease in the severity of surface flaws. In as-nitrided material, surface flaws are the strength governing flaws, as may be determined by removing these flaws by grinding and observing a strength increase. The surface flaw reduction is believed to result from a densification process in the surface or near surface layer. This increased density can be attributed to the formation of a "sialon" in the surface layer or it may be due to the deposition of fresh silicon nitride resulting from the presence of nitrogen and SiO at the surface in the proper amounts to create silicon nitride. It is also possible that the densification of the surface layers has resulted in the creation of surface compression layers.

Alternatively, there may be formed an aluminum silicate or a nitrogen containing aluminum silicate, the latter often being referred to as "X-phase" or "J-phase" (see Layden "Process Development for Pressureless Sintering of Sialon Ceramic Components", Second Quarterly Report on Contract N00019-75-C-0232, Aug. 3, 1975 prepared for Department of the Navy, Naval Air System Command, Washington, D.C.).

The actual role of the essential partial pressure of SiO is not completely understood. It may be performing one of several functions; it can be a reactant, in which case it can be forming a silicon nitride, a silicon oxynitride or a sialon. Additionally it may merely be preventing vaporization of SiO from the silicon nitride (or oxynitride) surface and thus acts to shift the equilibrium of the decomposition reaction of silicon nitride. Whatever function the SiO partial pressure performs it certainly has been demonstrated that the resultant product is a different kind of product which cannot be gotten, as far as it is known, without the presence of the SiO atmosphere.

While the invention has been described in connection with the preferred embodiment which utilizes the formation of a compound of Si, Al, $O_2$ and $N_2$, it is believed that other complex silicon oxynitrides can perform the same strengthening function. Among such complex compounds are believed to be the complex sialons containing additional substitutional metals such as Mg, Ca etc. It is also possible that a silicon oxynitride containing another metal, rather than aluminum, might work as well, one possibility being the use of yttrium.

What is claimed is:

1. In a process for increasing the strength of a previously formed reaction sintered silicon nitride body wherein the surface of the formed body is impregnated with a aluminum oxide ($Al_2O_3$) and fired in a nitrogen atmosphere at a temperature between about 1200° and about 1500° C, the improvement which comprises maintaining a substantial partial pressure of SiO in the atmosphere during said firing.

2. In a process for increasing the strength of a previously formed reaction sintered silicon nitride body wherein the surface of the formed body is impregnated with aluminum oxide and fired in a nitrogen atmosphere at a temperature above 1200° C, the improvement which comprises maintaining a substantial partial pressure of SiO in the atmosphere during said firing.

3. The process of claim 1 wherein the partial pressure of SiO is generated by heating a mixture of Si and $SiO_2$ to a temperature of at least 1200° C.

4. The process of claim 1 wherein the firing temperature does not exceed 1400° C during early portions of the firing cycle.

5. The product resulting from the process of claim 2.

* * * * *